(12) United States Patent
Kennedy et al.

(10) Patent No.: US 7,642,332 B2
(45) Date of Patent: Jan. 5, 2010

(54) AMPHIPHILIC NETWORKS, PROCESS FOR PRODUCING SAME, AND PRODUCTS MADE THEREFROM

(75) Inventors: Joseph P. Kennedy, Akron, OH (US); Radhakrishnan Karunakaran, Stow, OH (US)

(73) Assignee: The University of Akron, Akron, OH (US)

( * ) Notice: Subject to any disclaimer, the term of this patent is extended or adjusted under 35 U.S.C. 154(b) by 104 days.

(21) Appl. No.: 11/891,899

(22) Filed: Aug. 14, 2007

(65) Prior Publication Data
US 2008/0045661 A1 Feb. 21, 2008

Related U.S. Application Data

(60) Provisional application No. 60/837,543, filed on Aug. 14, 2006.

(51) Int. Cl.
*C08G 77/12* (2006.01)
*C08G 77/04* (2006.01)
(52) U.S. Cl. .......................................... 528/31; 528/25
(58) Field of Classification Search .................. 528/25, 528/31
See application file for complete search history.

(56) References Cited

U.S. PATENT DOCUMENTS

| | | | | |
|---|---|---|---|---|
| 4,877,854 | A * | 10/1989 | Hattori et al. .................. | 528/15 |
| 5,086,148 | A * | 2/1992 | Jochum et al. ................. | 528/15 |
| 5,211,877 | A * | 5/1993 | Andrejewski et al. .. | 252/299.01 |
| 5,231,206 | A * | 7/1993 | Spes et al. ................... | 556/413 |
| 5,554,779 | A * | 9/1996 | Sato et al. .................... | 556/419 |
| 5,610,258 | A * | 3/1997 | Weitzel et al. ................. | 528/25 |
| 5,641,850 | A * | 6/1997 | Stohrer et al. ................. | 528/15 |
| 6,005,051 | A * | 12/1999 | Kennedy et al. ............. | 525/106 |
| 6,320,010 | B1 * | 11/2001 | Sakaguchi et al. ............ | 528/25 |
| 6,528,584 | B2 * | 3/2003 | Kennedy et al. ............. | 525/101 |
| 6,624,236 | B1 * | 9/2003 | Bissinger et al. ............ | 524/588 |
| 7,071,277 | B2 * | 7/2006 | Kennedy et al. ............. | 528/15 |

(Continued)

FOREIGN PATENT DOCUMENTS

WO WO 03/037944 A1 5/2003

OTHER PUBLICATIONS

Karunakaran et al., Journal of Polymer Science: Part A, Polymer Chemistry, vol. 44, 2007, 308-316.*

(Continued)

*Primary Examiner*—Randy Gulakowski
*Assistant Examiner*—Robert Loewe
(74) *Attorney, Agent, or Firm*—Roetzel and Andress; Joseph J. Crimaldi

(57) ABSTRACT

The present invention relates to the production of amphiphilic copolymer networks, or co-networks, and to methods for preparing amphiphilic co-networks. Furthermore, the present invention relates to products and/or films made from the amphiphilic co-networks produced in accordance with the synthesis methods of the present invention. Additionally, the present invention relates to crosslinked amphiphilic co-networks comprising at least one hydrophilic segment and at least one hydrophobic segment. In one embodiment, the hydrophilic segments include at least one polyalkyl glycol (e.g., polyethylene glycol (PEG)) and the hydrophobic segments include at least one di-alkenyl and/or di-alkynyl terminated polysiloxane (e.g., polydimethylsiloxane (PDMS)). In another embodiment, the amphiphilic co-networks of the present invention are optically clear and highly oxophilic.

53 Claims, 1 Drawing Sheet

U.S. PATENT DOCUMENTS

| | | | |
|---|---|---|---|
| 7,241,852 B2 * | 7/2007 | Walker et al. | 528/15 |
| 7,323,250 B2 * | 1/2008 | Tabei et al. | 428/447 |
| 7,414,103 B2 * | 8/2008 | Musa | 528/31 |
| 7,425,600 B2 * | 9/2008 | Schorzman et al. | 526/242 |
| 7,429,636 B2 * | 9/2008 | Asch et al. | 528/31 |
| 7,449,536 B2 * | 11/2008 | Chapman et al. | 528/10 |
| 7,473,491 B1 * | 1/2009 | Amine et al. | 429/303 |
| 2006/0111491 A1 * | 5/2006 | Asch et al. | 524/261 |

OTHER PUBLICATIONS

ASTM D1598-97, Annual Book of ASTM standards, Aug. 4, 1999, pp. 23-26.

Kurian, P. et al, Novel Tricontinuous Hydrophilic-Lipophilic-Oxyphilic Membranes: Synthesis and Characterization, J. Polym. Sci. Part A: Polym. Chem. 2002, 40, pp. 1209-1217.

Erdodi, G. et al, Water-Swollen Highly Oxygen Permeable Membranes: Analytical Technique and Synthesis, J. Polym. Sci. Part A: Polym. Chem. 2005, 43, pp. 3491-3501.

Nugay, N. et al, Cyclosiloxane-Based Networks: Synthesis, Thermal Charaterization, and Microstructure, J. Polym. Sci. Part A: Polym. Chem 2005, 43, pp. 630-637.

Kennedy, J.P. et al, From Thermoplastic Elastomers to Desined Biomaterials, J. Polym. Sci: Polym. Chem. 2005, 43, pp. 2951-2963.

Kurian, P. et al, Synthesis and Characterization of Novel Amphiphilic Block Copolymers Di-, Tri-, Multi-, and Star Blocks . . . , J. Polym. Sci. Polym. Chem. 2002, 38, pp. 3200-3209.

Kunzler, J.F., Silicone Hydrogels for Contact Lens Application, Trends Polym. Sci. 1996. 4, pp. 52-59.

Kunzler, J.F. et al, Methacrylate-Capped Fluoro Side Chain Siloxanes: Synthesis, Characterization, and Their Use in the Design . . . , J. Appl. Polym. Sci. 1997, 65, pp. 1081-1089.

Kurian, P. et al, Synthesis, permeability and biocompatibility of tricomponent membranes containing polyethylene glycol, . . . , Biomaterials 24, 2003, pp. 3493-3503.

Compan, V. et al, Oxygen permeability of hydrogel contact lenses with organosilicon moieties, Biomaterials 23, 2002, pp. 2767-2772.

* cited by examiner

AMPHIPHILIC NETWORKS, PROCESS FOR PRODUCING SAME, AND PRODUCTS MADE THEREFROM

RELATED APPLICATION DATA

This application claims priority to previously filed U.S. Provisional Application No. 60/837,543, filed on Aug. 14, 2006, entitled "Amphiphilic Networks, Process for Producing Same, and Products Made Therefrom," which is hereby incorporated by reference in its entirety.

FIELD OF THE INVENTION

The present invention relates to the production of amphiphilic copolymer networks, or co-networks, and to methods for preparing amphiphilic co-networks. Furthermore, the present invention relates to products and/or films made from the amphiphilic co-networks produced in accordance with the synthesis methods of the present invention. Additionally, the present invention relates to crosslinked amphiphilic co-networks comprising at least one hydrophilic segment and at least one hydrophobic segment. In one embodiment, the hydrophilic segments include at least one polyalkyl glycol (e.g., polyethylene glycol (PEG)) and the hydrophobic segments include at least one di-alkenyl and/or di-alkynyl terminated polysiloxane (e.g., polydimethylsiloxane (PDMS)). In another embodiment, the amphiphilic co-networks of the present invention are optically clear and highly oxophilic.

BACKGROUND OF THE INVENTION

Many medical deficiencies and diseases result from the inability of cells to produce normal biologically active moieties. Many of these deficiencies can be remedied by implanting the needed biologically active moieties or pharmacological agents into the individual having the deficiency. A well known disease that can be remedied by implanting biological material or a pharmacological agent is Type I diabetes mellitus, wherein the production of insulin by pancreatic Langerhans islet cells is substantially deficient, impaired, or nonexistent.

For example, encapsulating human islet cells or tissues within a biologically compatible device followed by implanting the device into a host individual has been proposed as a means for providing insulin to an individual with Type I diabetes. However, an individual's immune response frequently attacks foreign biological material such as cells, tissues, and organs. Such a response severely limits the effectiveness of methods that involve implanting foreign biological material.

Porcine pancreatic islet cells can produce insulin, and their supply is much greater than that of human pancreatic islet cells. Therefore, transplanting porcine islet cells, if effectively immunoisolated from the normal immunological response of a human, would be of great benefit to a vast number of individuals with Type I diabetes.

Amphiphilic co-networks can serve as a means to encapsulate and thereby immunoisolate implantable biologically active moieties. Generally, amphiphilic co-networks comprise hydrophilic and hydrophobic polymers that can swell in both polar and non-polar solvents.

Additionally, amphiphilic networks and/or co-networks can be used to produce polymer films that swell in both polar and non-polar solvents. Accordingly, films made from amphiphilic polymer networks and/or co-networks have been found to be desirable in the production of contact lenses.

One problem associated with the synthesis of amphiphilic co-networks is how to overcome the thermodynamic incompatibility of the hydrophilic and hydrophobic constituents that will make up the amphiphilic co-network, and to unite two incompatible pre-polymers and/or polymers into a bi-continuous/bi-percolating construct. Typically, crosslinking of such systems is carried out in homogeneous solution in a common solvent at low pre-polymer and/or polymer concentrations, followed by the addition of a suitable crosslinker (i.e., by dissolving the two pre-polymers which are generally incompatible in their dry states). While this method yields uniform co-networks, the removal of the common solvent is accompanied by massive shrinkage, which renders the method technically impractical. Also, the dimensional stability of such co-networks is poor, the surface properties are hard to control, and the co-networks (or products formed therefrom) are fragile and difficult to manipulate.

Thus, there is a need in the art for reliable synthesis routes for amphiphilic co-networks. Specifically, desirable synthesis routes would include those that permit the control of one or more chemical and/or physical properties of amphiphilic co-networks. Also of interest are synthesis routes for amphiphilic co-networks that produce amphiphilic co-networks that are suitable for use in medical (e.g., cell encapsulation), biological and ophthalmic uses.

SUMMARY OF THE INVENTION

The present invention relates to the production of amphiphilic copolymer networks, or co-networks, and to methods for preparing amphiphilic co-networks. Furthermore, the present invention relates to products and/or films made from the amphiphilic co-networks produced in accordance with the synthesis methods of the present invention. Additionally, the present invention relates to crosslinked amphiphilic co-networks comprising at least one hydrophilic segment and at least one hydrophobic segment. In one embodiment, the hydrophilic segments include at least one polyalkyl glycol (e.g., polyethylene glycol (PEG)) and the hydrophobic segments include at least one di-alkenyl and/or di-alkynyl terminated polysiloxane (e.g., polydimethylsiloxane (PDMS)). In another embodiment, the amphiphilic co-networks of the present invention are optically clear and highly oxophilic.

In one embodiment, the present invention relates to a multicomponent network comprising the reaction product of at least one hydrophilic polymer, at least one hydrophobic polymer and at least one mono-modified alkyl-substituted cyclopentasiloxane crosslinking composition according to the following formula:

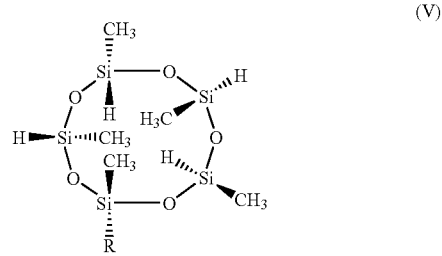

(V)

where R is a moiety having one or more ethylene oxide units and 2 to 20 carbon atoms, a di-glycol moiety that contains from 4 to about 20 carbon atoms, an ether moiety that contains from about 4 to about 20 carbon atoms, a partially or fully halogenated ether moiety that contains from about 4 to about 20 carbon atoms, or a siloxy silane moiety according to the formula shown below:

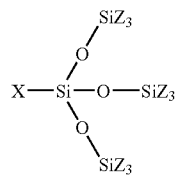

where X is a linear or branched $C_1$ to $C_{10}$ alkyl group, a linear or branched $C_2$ to $C_{10}$ alkenyl group, a linear or branched $C_2$ to $C_{10}$ alkynyl group, and where each Z is independently selected from a linear or branched $C_1$ to $C_{20}$ alkyl group, a linear or branched $C_2$ to $C_{20}$ alkenyl group, a linear or branched $C_2$ to $C_{10}$ alkynyl group.

In another embodiment, the present invention relates to a multicomponent network comprising the reaction product of at least one hydrophilic polymer, at least one polydimethylsiloxane polymer and at least one mono-modified alkyl-substituted cyclopentasiloxane crosslinking composition according to the following formula:

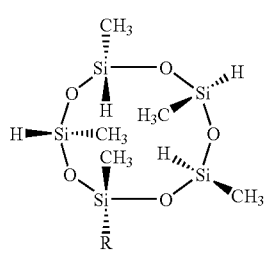

(V)

where R is a moiety having one or more ethylene oxide units and 2 to 20 carbon atoms, a di-glycol moiety that contains from 4 to about 20 carbon atoms, an ether moiety that contains from about 4 to about 20 carbon atoms, a partially or fully halogenated ether moiety that contains from about 4 to about 20 carbon atoms, or a siloxy silane moiety according to the formula shown below:

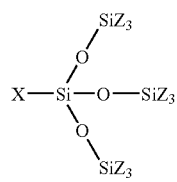

where X is a linear or branched $C_1$ to $C_{10}$ alkyl group, a linear or branched $C_2$ to $C_{10}$ alkenyl group, a linear or branched $C_2$ to $C_{10}$ alkynyl group, and where each Z is independently selected from a linear or branched $C_1$ to $C_{20}$ alkyl group, a linear or branched $C_2$ to $C_{20}$ alkenyl group, a linear or branched $C_2$ to $C_{10}$ alkynyl group.

In still another embodiment, the present invention relates to a multicomponent network comprising the reaction product of at least one hydrophilic polymer, at least one di-alkenyl or di-alkynyl terminated polysiloxane polymer and at least one mono-, di-, tri- or tetra-modified cyclopentasiloxane crosslinking composition as shown in the formula below:

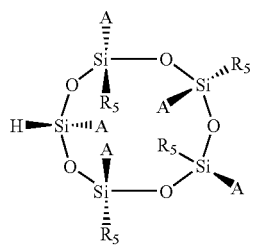

(VI)

where the As are either all methyl groups, all ethyl groups, or all propyl groups, where each $R_5$ is independently selected from hydrogen, a moiety having one or more ethylene oxide units and 2 to 20 carbon atoms, a di-glycol moiety that contains from 4 to about 20 carbon atoms, an ether moiety that contains from about 4 to about 20 carbon atoms, a partially or fully halogenated ether moiety that contains from about 4 to about 20 carbon atoms, or a siloxy silane moiety according to the formula shown below:

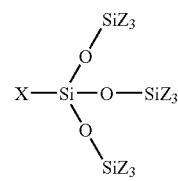

where X is a linear or branched $C_1$ to $C_{10}$ alkyl group, a linear or branched $C_2$ to $C_{10}$ alkenyl group, a linear or branched $C_2$ to $C_{10}$ alkynyl group, and where each Z is independently selected from a linear or branched $C_1$ to $C_{20}$ alkyl group, a linear or branched $C_2$ to $C_{20}$ alkenyl group, a linear or branched $C_2$ to $C_{10}$ alkynyl group.

In yet another embodiment, the present invention relates to a crosslinking composition comprising at least one mono-, di-, tri- or tetra-modified cyclopentasiloxane composition as shown in the formula below:

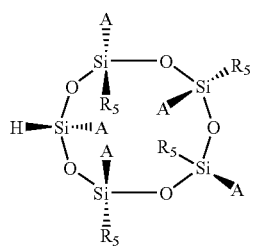

(VI)

where the As are either all methyl groups, all ethyl groups, or all propyl groups, where each $R_5$ is independently selected from hydrogen, a moiety having one or more ethylene oxide units and 2 to 20 carbon atoms, a di-glycol moiety that contains from about 4 to about 20 carbon atoms, a partially or fully halogenated ether moiety that contains from about 4 to about 20 carbon atoms, or a siloxy silane moiety according to the formula shown below:

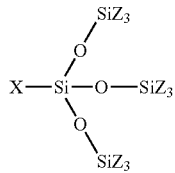

(5)

where X is a linear or branched $C_1$ to $C_{10}$ alkyl group, a linear or branched $C_2$ to $C_{10}$ alkenyl group, a linear or branched $C_2$ to $C_{10}$ alkynyl group, and where each Z is independently selected from a linear or branched $C_1$ to $C_{20}$ alkyl group, a linear or branched $C_2$ to $C_{20}$ alkenyl group, a linear or branched $C_2$ to $C_{10}$ alkynyl group.

In still another embodiment, the present invention relates to a crosslinking composition comprising at least one mono-modified alkyl-substituted cyclopentasiloxane according to the following formula:

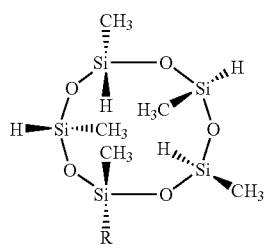

(V)

where R is a moiety having one or more ethylene oxide units and 2 to 20 carbon atoms, a di-glycol moiety that contains from 4 to about 20 carbon atoms, an ether moiety that contains from about 4 to about 20 carbon atoms, a partially or fully halogenated ether moiety that contains from about 4 to about 20 carbon atoms, or a siloxy silane moiety according to the formula shown below:

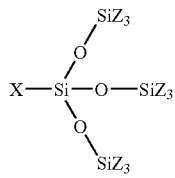

where X is a linear or branched $C_1$ to $C_{10}$ alkyl group, a linear or branched $C_2$ to $C_{10}$ alkenyl group, a linear or branched $C_2$ to $C_{10}$ alkynyl group, and where each Z is independently selected from a linear or branched $C_1$ to $C_{20}$ alkyl group, a linear or branched $C_2$ to $C_{20}$ alkenyl group, a linear or branched $C_2$ to $C_{10}$ alkynyl group.

In still another embodiment, the present invention relates to a method for forming an amphiphilic network or co-network comprising the steps of: (A) combining at least one hydrophilic polymer and at least one hydrophobic polymer to form a polymer mixture; (B) adding at least one mono-, di-, tri- or tetra-modified cyclopentasiloxane composition to the polymer mixture of Step (A) to form a polymer-crosslinker mixture, the at least one mono-, di-, tri- or tetra-modified cyclopentasiloxane composition having a chemical formula as shown below:

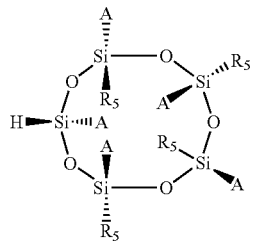

(VI)

where the As are either all methyl groups, all ethyl groups, or all propyl groups, where each $R_5$ is independently selected from hydrogen, a moiety having one or more ethylene oxide units and 2 to 20 carbon atoms, a di-glycol moiety that contains from 4 to about 20 carbon atoms, an ether moiety that contains from about 4 to about 20 carbon atoms, a partially or fully halogenated ether moiety that contains from about 4 to about 20 carbon atoms, or a siloxy silane moiety having a chemical formula as shown below:

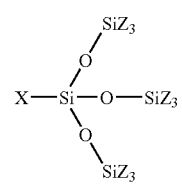

where X is a linear or branched $C_1$ to $C_{10}$ alkyl group, a linear or branched $C_2$ to $C_{10}$ alkenyl group, a linear or branched $C_2$ to $C_{10}$ alkynyl group, and where each Z is independently selected from a linear or branched $C_1$ to $C_{20}$ alkyl group, a linear or branched $C_2$ to $C_{20}$ alkenyl group, a linear or branched $C_2$ to $C_{10}$ alkynyl group; (C) heating the polymer-crosslinker mixture of Step (B) to yield a pourable polymer-crosslinker mixture; and (D) crosslinking the pourable polymer-crosslinker mixture of Step (C) to yield a crosslinked amphiphilic network or co-network.

In still another embodiment, the present invention relates to a method for forming an amphiphilic network or co-network comprising the steps of: (i) combining at least one hydrophilic polymer and at least one hydrophobic polymer to form a polymer mixture; (ii) adding at least one mono-modified alkyl-substituted cyclopentasiloxane crosslinking composition to the polymer mixture of Step (i) to form a polymer-crosslinker mixture, the at least one mono-modified alkyl-substituted cyclopentasiloxane crosslinking composition having a chemical formula as shown below:

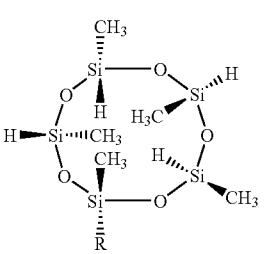

(V)

where R is a moiety having one or more ethylene oxide units and 2 to 20 carbon atoms, a di-glycol moiety that contains from 4 to about 20 carbon atoms, an ether moiety that contains from about 4 to about 20 carbon atoms, a partially or fully halogenated ether moiety that contains from about 4 to about 20 carbon atoms, or a siloxy silane moiety having a chemical formula as shown below:

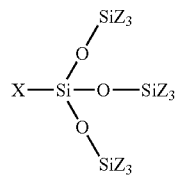

where X is a linear or branched $C_1$ to $C_{10}$ alkyl group, a linear or branched $C_2$ to $C_{10}$ alkenyl group, a linear or branched $C_2$ to $C_{10}$ alkynyl group, and where each Z is independently selected from a linear or branched $C_1$ to $C_{20}$ alkyl group, a linear or branched $C_2$ to $C_{20}$ alkenyl group, a linear or branched $C_2$ to $C_{10}$ alkynyl group; (iii) heating the polymer-crosslinker mixture of Step (ii) to yield a pourable polymer-crosslinker mixture; and (iv) crosslinking the pourable polymer-crosslinker mixture of Step (iii) to yield a crosslinked amphiphilic network or co-network.

DETAILED DISCLOSURE OF THE INVENTION

Figure 1:
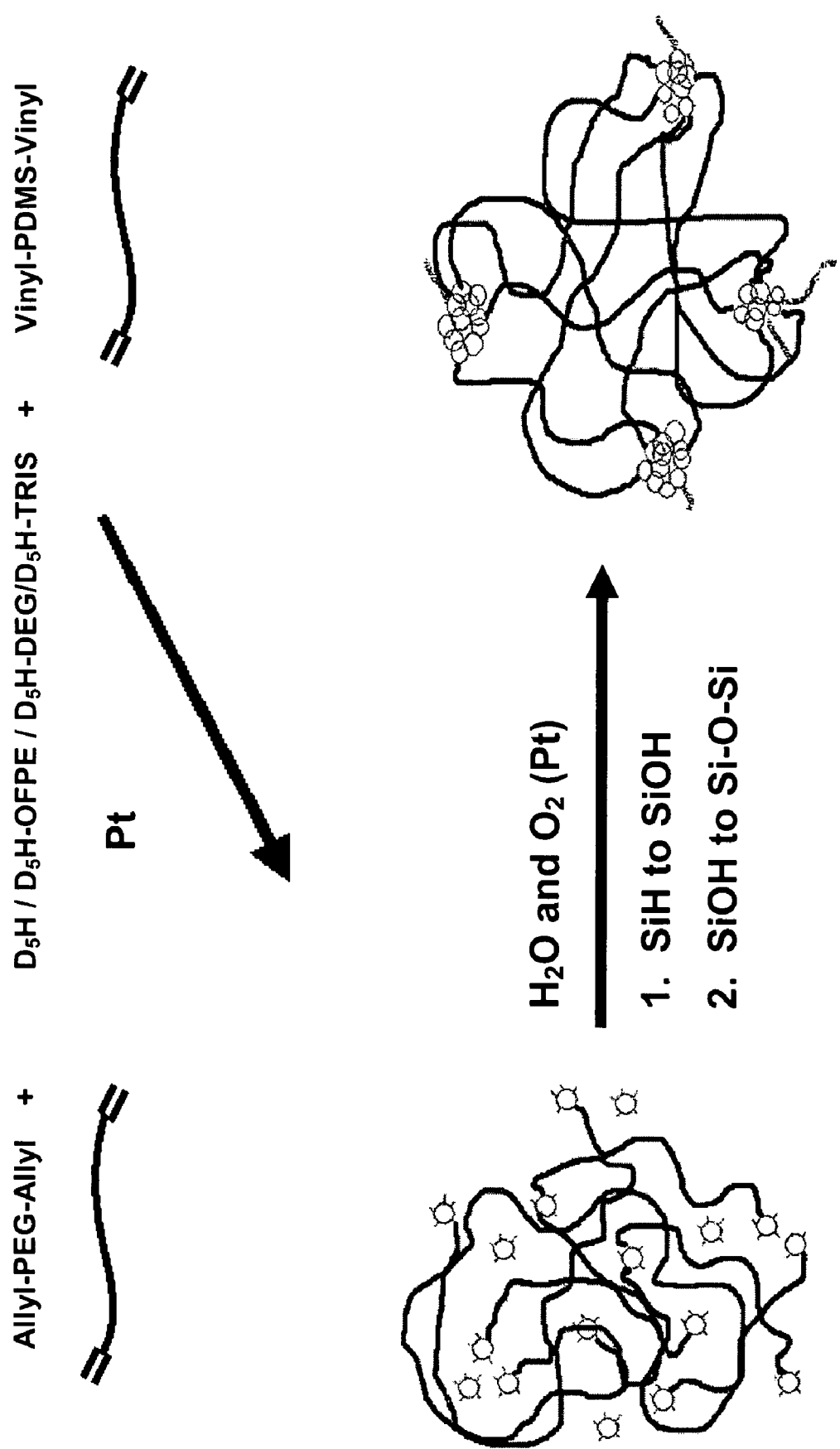
FIG. 1 is an illustration of a reaction scheme detailing the synthesis of an amphiphilic network and/or co-network according to one embodiment of the present invention.

The present invention relates to the production of amphiphilic copolymer networks, or co-networks, and to methods for preparing amphiphilic co-networks. Furthermore, the present invention relates to products and/or films made from the amphiphilic co-networks produced in accordance with the synthesis methods of the present invention. Additionally, the present invention relates to crosslinked amphiphilic co-networks comprising at least one hydrophilic segment and at least one hydrophobic segment. In one embodiment, the hydrophilic segments include at least one polyalkyl glycol (e.g., polyethylene glycol (PEG)) and the hydrophobic segments include at least one di-alkenyl and/or di-alkynyl terminated polysiloxane (e.g., polydimethylsiloxane (PDMS)). In another embodiment, the amphiphilic co-networks of the present invention are optically clear and highly oxophilic.

Polymers:

As is discussed above, the crosslinked amphiphilic copolymer networks or co-networks of the present invention contain at least one hydrophobic polymer and at least one hydrophilic polymer.

In one embodiment, the present invention utilizes a combination of at least one polyalkyl glycol polymer with at least one di-alkenyl and/or di-alkynyl terminated siloxane polymer (e.g., polydimethylsiloxane (PDMS)) to form amphiphilic co-networks. In such an embodiment, the at least one polyalkyl glycol polymer functions as the hydrophilic polymer, while the at least one di-alkenyl and/or di-alkynyl terminated polysiloxane siloxane polymer functions as the hydrophobic polymer. In one instance, each polymer used to form the amphiphilic co-networks of the present invention independently have from about 5 to about 5,000 repeating polymer units, or from about 10 to about 2,500 repeating polymer units, or from about 25 to about 1,000 repeating polymer units, or even from about 40 to about 500 repeating polymer units. Here, as well as elsewhere in the specification and claims, individual range limits may be combined.

It should be noted that the present invention is not limited to polymers having the above-mentioned number of repeating units. Instead, the present invention can utilize any suitable combination of hydrophilic and hydrophobic polymers having any number of repeating units so long as the polymers used can form amphiphilic co-networks. Another consideration that needs to be taken into account when choosing the polymers used to form the amphiphilic co-networks of the present invention is the intended use for the amphiphilic co-network. For example, if the amphiphilic co-network is going to be formed into a film to be used as a contact lens, then the polymers used in the present invention should at a minimum yield optically transparent amphiphilic co-networks. As would be apparent to one of ordinary skill in the art, depending upon the desired use for the amphiphilic co-networks of the present invention, one may have to take into consideration a wide variety of physical, chemical and/or mechanical properties of the polymers used to form such networks.

In another embodiment, the present invention utilizes a combination of at least one polyethylene glycol polymer with at least one polydimethylsiloxane polymer. Exemplary polyethylene glycol (e.g., allyl-polyethylene glycol-allyl (A-PEG-A)) and polydimethylsiloxane polymers (e.g., vinyl ditelechelic polydimethylsiloxane (V-PDMS-V)) are shown below in Formulas (I) and (II), respectively,

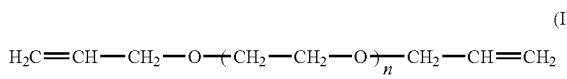

where n is equal to an integer in the range of about 5 to about 5,000, or from about 10 to about 2,500, or from about 25 to about 1,000, or even from about 40 to about 500, and

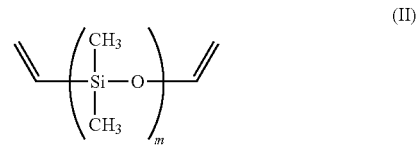

where m is equal to an integer in the range of about 5 to about 5,000, or from about 10 to about 2,500, or from about 25 to about 1,000, or even from about 40 to about 500. It should be noted that the present invention is not limited to just the polyethylene glycol and polydimethylsiloxane polymers of Formulas (I) and (II). Rather, in this embodiment any suitable combination of polyethylene glycol and di-alkenyl and/or di-alkynyl terminated polydimethylsiloxane polymers can be used.

The polydimethylsiloxane polymer of Formula (II) can, for example, be purchased from Gelest, Tulleytown, Pa. Alternatively, if so desired, the polymer of Formula (II) could be synthesized thereby permitting one to control the number of repeating units present in the polymer of Formula (II).

With regard to the polymer of Formula (I), this polymer can be formulated via a variety of methods that include, but are not limited to, those methods disclosed in the article entitled *Synthesis and Characterization of Novel Amphiphilic Block Copolymers Di-, Tri-, Multi-, and Star Blocks of PEG and PIB*; P. Kuriam et al.; *Journal of Polymer Science: Part A: Polymer Chemistry*, Vol. 38, pp. 3200 to 3209 (2000).

In another embodiment, the at least one di-alkenyl and/or di-alkynyl terminated polydimethylsiloxane polymer utilized in the present invention can be selected from any polymer according to Formula (III) shown below:

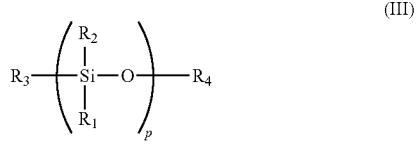

(III)

where p is equal to an integer in the range of about 5 to about 5,000, or from about 10 to about 2,500, or from about 25 to about 1,000, or even from about 40 to about 500; and where $R_1$ and $R_2$ are independently $C_1$ to $C_6$ alkyl groups, or even $C_1$ to $C_4$ alkyl groups, and $R_3$ and $R_4$ are independently $C_2$ to $C_{10}$ alkenyl groups, $C_2$ to $C_7$ alkenyl groups, or even $C_2$ to $C_5$ alkenyl groups. In another embodiment, $R_3$ and $R_4$ are independently $C_2$ to $C_{10}$ alkynyl groups, $C_2$ to $C_7$ alkynyl groups, or even $C_2$ to $C_5$ alkynyl groups. Again, here, as well as elsewhere in the specification and claims, individual range limits may be combined.

In still another embodiment, $R_1$ and $R_2$ are identical substituent groups (e.g., all methyl groups, all propyl groups or all butyl groups), and $R_3$ and $R_4$ are identical substituent groups (e.g., all vinyl groups, or all alkenyl groups).

In still yet another embodiment, the present invention utilizes a combination of at least one hydrophilic polymer, at least one hydrophobic polymer and at least one silicone-containing crosslinker to form crosslinked amphiphilic co-networks. In this embodiment, the at least one hydrophilic polymer that is selected from one or more polyalkyl glycol polymers, one or more di-alkenyl and/or di-alkynyl terminated poly N-vinyl pyrrolidinone polymers, one or more di-alkenyl and/or di-alkynyl terminated poly-dimethylacrylamide polymers, one or more di-alkenyl and/or di-alkynyl terminated poly-oxazoline polymers, or combinations of two or more different hydrophilic polymers thereof. In this embodiment, the di-alkenyl and di-alkynyl terminating groups can be independently selected from $C_2$ to $C_{10}$ alkenyl groups and/or $C_2$ to $C_{10}$ alkynyl groups. In another embodiment, the di-alkenyl and di-alkynyl terminating groups can be independently selected from $C_2$ to $C_7$ alkenyl groups, $C_2$ to $C_5$ alkenyl groups, $C_2$ to $C_7$ alkynyl groups, or $C_2$ to $C_5$ alkynyl groups. In one embodiment, the hydrophilic polymers of the present invention have from about 5 to about 5,000 repeating units, or from about 10 to about 2,500 repeating units, or from about 25 to about 1,000 repeating units, or even from about 40 to about 500 repeating units.

Crosslinker:

In one embodiment, the present invention utilizes a silicon-containing crosslinker. Suitable silicon-containing crosslinking compositions include, but are not limited to, multi-SiH functional cyclosiloxanes. In one embodiment, the crosslinker of the present invention is or is derived from one or more alkyl-substituted cyclopentasiloxane compositions (e.g., pentamethylcyclopentasiloxane—$D_5H$). Pentamethylcyclopentasiloxane ($D_5H$) is available commercially and its structure is shown below in Formula (IV):

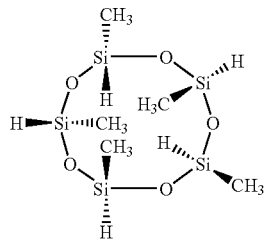

(IV)

In another embodiment, the crosslinking composition of the present invention is at least one mono-modified cyclopentasiloxane composition as shown in Formula (V) below:

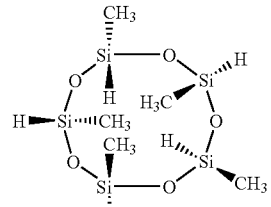

(V)

where R is a moiety having one or more ethylene oxide units and 2 to 20 carbon atoms, a di-glycol moiety that contains from 4 to about 20 carbon atoms, an ether moiety that contains from about 4 to about 20 carbon atoms, a partially or fully halogenated (e.g., fluorinated) ether moiety that contains from about 4 to about 20 carbon atoms, or a siloxy silane moiety according to the formula shown below:

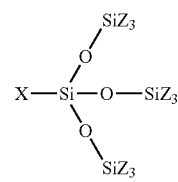

where X is a linear or branched $C_1$ to $C_{10}$ alkyl group, a linear or branched $C_2$ to $C_{10}$ alkenyl group, a linear or branched $C_2$ to $C_{10}$ alkynyl group, and where each Z is independently selected from a linear or branched $C_1$ to $C_{20}$ alkyl group, a linear or branched $C_2$ to $C_{20}$ alkenyl group, a linear or branched $C_2$ to $C_{10}$ alkynyl group. In one instance, all the Zs are identical (e.g., all methyl groups or all ethyl groups).

In still another embodiment, the crosslinking composition of the present invention is at least one mono-, di-, tri- or tetra-modified cyclopentasiloxane composition as shown in the formula below:

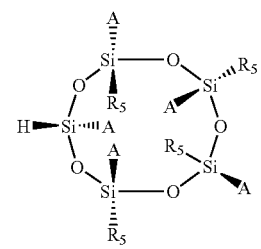

(VI)

where the As are either all methyl groups, all ethyl groups, or all propyl groups, where each $R_5$ is independently selected from hydrogen, a moiety having one or more ethylene oxide units and 2 to 20 carbon atoms, a di-glycol moiety that contains from 4 to about 20 carbon atoms, an ether moiety that contains from about 4 to about 20 carbon atoms, a partially or fully halogenated (e.g., fluorinated) ether moiety that contains from about 4 to about 20 carbon atoms, or a siloxy silane moiety according to the formula shown below:

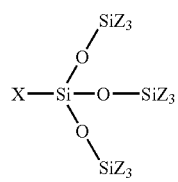

where X is a linear or branched $C_1$ to $C_{10}$ alkyl group, a linear or branched $C_2$ to $C_{10}$ alkenyl group, a linear or branched $C_2$ to $C_{10}$ alkynyl group, and where each Z is independently selected from a linear or branched $C_1$ to $C_{20}$ alkyl group, a linear or branched $C_2$ to $C_{20}$ alkenyl group, a linear or branched $C_2$ to $C_{10}$ alkynyl group. The terms mono-, di-, tri- and tetra-modified mean that in Formula (VI) either three $R_5$s, two $R_5$s, one $R_5$, or no $R_5$s are hydrogen, respectively.

In yet another embodiment, each $R_5$ group is either a hydrogen or an identical substituent group other than hydrogen (e.g., one $R_5$ could be hydrogen while the remaining three $R_5$ groups are identical di-glycol moieties). In one instance, all the Zs are identical (e.g., all methyl groups or all ethyl groups).

In still another embodiment, the crosslinking composition utilized in the present invention is selected from one or more of $D_5H.TRIS$, $D_5H.OFPE$, and/or $D_5H.DEG$. These crosslinkers are shown below in Formulas (VII), (VIII) and (IX), respectively:

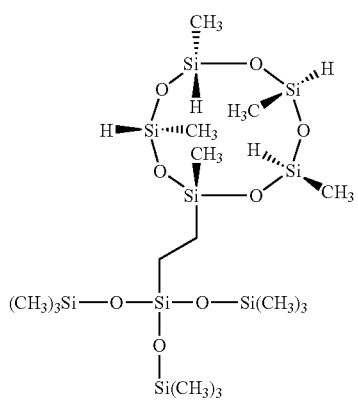

(VII)

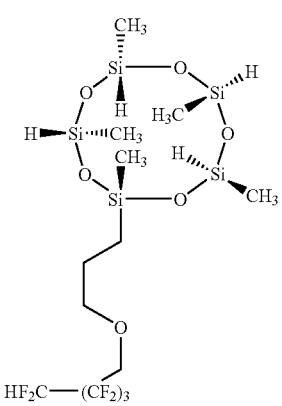

(VIII)

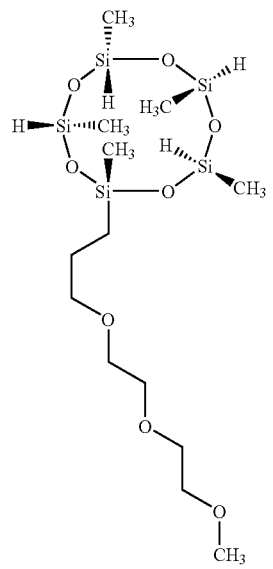

(IX)

Crosslinking and Formation of Amphiphilic Co-Networks:

In one embodiment, amphiphilic copolymer networks and/or co-networks are synthesized by using at least one multi-SiH functional cyclosiloxane crosslinker (e.g., $D_5H$). FIG. 1 outlines the starting ingredients for one embodiment according to the present invention, and shows an idealized structure of an amphiphilic co-network that has been crosslinked via poly-condensed $D_5H$ ($PD_5$) domains.

In this embodiment, the synthesis of an amphiphilic co-network starts by the random co-hydrosilation of A-PEG-A and V-PDMS-V pre-polymers by $D_5H$ and concludes by the polycondensation of $D_5H$ to $PD_5$, which in addition to crosslinking the network also provides reinforcing domains.

While not wishing to be bound to any one embodiment and/or theory, since the crosslinking of the A-PEG-A and V-PDMS-V pre-polymers consumes only 2 to 3 of the five Si—H groups in $D_5H$, it is believed that the SiH groups remaining after crosslinking and $PD_5$ formation can, if so desired, be used to introduce other desirable substituents. Suitable substituent groups include, but are not limited to, one or more TRIS substituents (a tris(trimethylsiloxy) silane substituent group), one or more OFPE substituents (an octofluoropentyl substituent group), and one or more DEG substituents (a diethylene glycol substituent group) to enhance, respectively, the oxygen permeability, the compatibility between the incompatible PEG and PDMS domains, and water uptake of the final constructs. In another embodiment, any SiH group or groups remaining after crosslinking of the $D_5H$ and $PD_5$ formation can be used to introduce multiple different substituent groups such as, but not limited to, any combination of one or more TRIS substituents, one or more OFPE substituents, and/or one or more DEG substituents.

Reaction Schemes 1 through 3, shown below, detail one possible synthesis route to produce each of the crosslinking compounds shown in Formulas (VII), (VIII) and (IX).

Reaction Scheme 1

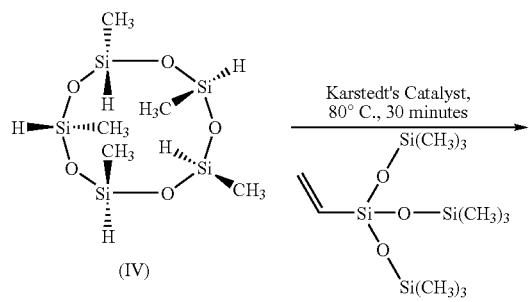

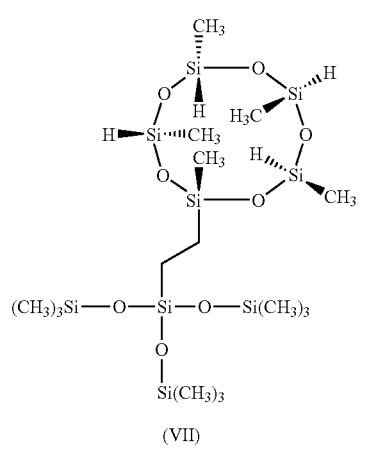

Reaction Scheme 2

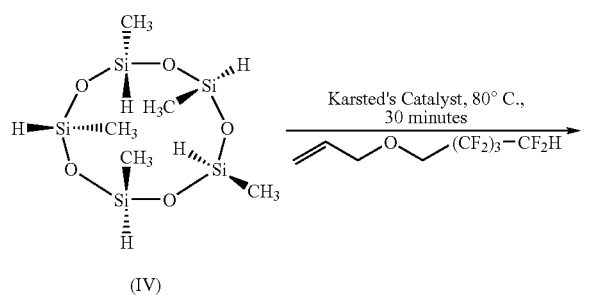

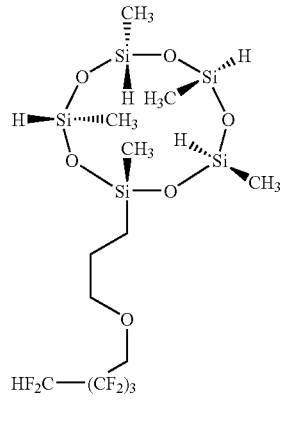

(VIII)

Reaction Scheme 3

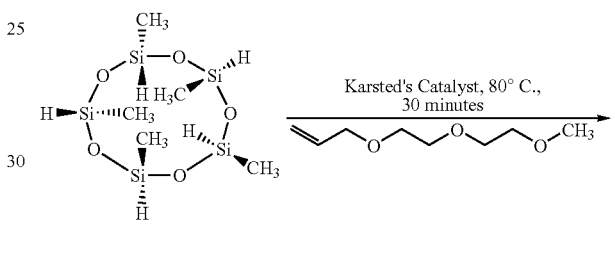

(IX)

Again, while not wishing to be bound to any one embodiment and/or theory, the TRIS substituent group is utilized to improve and/or enhance the oxygen permeability of films, membranes or other structures formed from the amphiphilic networks and/or co-networks of the present invention. On the other hand, the OFPE substituent is utilized to improve and/or enhance the compatibility of the PEG and PDMS domains in the amphiphilic networks and/or co-networks of the present invention, and the DEG substituent is utilized to improve and/or enhance the water uptake of the amphiphilic networks and/or co-networks of the present invention. Again, the present invention is not limited to just the above-mentioned substituents. Rather, any desired substituents that can be attached to the $D_5H$ crosslinker molecule can be utilized in conjunction with the present invention.

EXAMPLES

The following examples of the production and/or formation of the above-mentioned crosslinking compounds and amphiphilic co-networks are for illustrative purpose only, and the present invention is not limited thereto.

Materials:

Sodium hydroxide (available from Aldrich), allyl bromide (available from Aldrich), 2-(2-methoxy ethoxy) ethanol (available from Acros), 2,2,3,3,4,4,5,5-octafluoro-1-pentanol (available from Synquest Laboratories), tetrabutyl-ammonium hydrogen sulfate (TBAH) (available from Aldrich), sodium hydroxide (available from Aldrich), pentamethylcyclopentasiloxane ($D_5H$) (available from Gelest), vinyl TRIS (available from Gelest), toluene (available from Fischer), Karstedt's catalyst (platinum-divinyl tetramethylsiloxane complex in xylene) (available from Gelest), and α,ω-divinyl PDMS (V-PDMS-V, $M_n$=28,500 grams/mole and 9,400 grams/mole) (available from Gelest) are used as obtained from their respective suppliers without further purification. The synthesis of α,ω-diallyl PEG (A-PEG-A, $M_n$=4000 grams/mole) is prepared by reacting α,ω-dihydroxy PEG (OH-PEG-OH) with excess allyl bromide over NaOH powder in toluene for about 12 hours at approximately 45° C.

Synthesis of $CH_2$=CH—$CH_2$—O—$CH_2$—$(CF_2)_3$—$CF_2$H (Allyl-OFPE):

NaOH (47 grams) is dissolved in 190 mL of water and is placed into a 500 mL round bottom flask. Next, 20 grams, $86.2\times10^{-3}$ moles, of 2,2,3,3,4,4,5,5-octafluoro-1-pentanol is added under vigorous stirring to the NaOH solution. TBAH (2.25 grams, $6.62\times10^{-3}$ moles), 190 mL of dichloromethane, and 14 grams ($116\times10^3$ moles) of allyl bromide are added to the NaOH/2,2,3,3,4,4,5,5-octafluoro-1-pentanol mixture. The resulting homogeneous mixture is refluxed overnight. The aqueous and organic layers are separated by a separatory funnel. The organic layer is washed three times with acidified water and then finally with pure water. Allyl-OFPE is obtained by distillation of the organic layer, and is further purified by repeat distillation. Yield is about 80%; with the purity being about 99.9% (confirmed by GC). $^1$H NMR (CDCl$_3$, 300 MHz): δ 3.9 (t, 2H, —CF$_2$—CH$_2$—O—), 4.1 (d, 2H, —O—CH$_2$—CH—), 5.3 (m, 2H, CH$_2$=CH—), 5.8 (m, 1H, CH$_2$=CH—CH$_2$—), 6.1 (t, 1H, —CF$_2$—H).

Synthesis of $D_5H$.OFPE:

A stoichiometric excess of $D_5H$ is used to maximize the formation of the mono-substituted $D_5H$. Thus, 24.04 grams of $D_5H$ ($80\times10^{-3}$ moles) is placed into a 100 mL round bottom flask and 14.6 grams of allyl-OFPE ($53.7\times10^{-3}$ moles) is added thereto via a syringe. Karstedt's catalyst (40 μL, 4.5× $10^{-6}$ moles as platinum) is added and the flask is closed with a rubber septum. The system is heated at 80° C. for 30 minutes in an oil bath. The resulting product is isolated by distillation under reduced pressure. Yield is about 70%; with the purity being about 87% (confirmed by GC). $^1$H NMR (CDCl$_3$, 300 MHz): δ 0.1 (s, 15H, Si—CH$_3$), 0.5 (t, 2H, Si—CH$_2$—), 1.6 (m, 2H, Si—CH$_2$—CH$_2$—), 3.6 (t, 2H, —CF$_2$—CH$_2$—O—), 4.1 (d, 2H, —O—CH$_2$—CH—), 4.7 (s, 4H, Si—H), 6.1 (t, 1H, —CF$_2$—H).

Synthesis of $CH_2$=CH—$CH_2$—O—$CH_2$—$CH_2$—O—$CH_2$—$CH_2$—O—$CH_3$ (Allyl 2-(2-methoxy ethoxy)ethyl ether):

NaOH (6 grams), 80 mL of toluene and 11 grams of 2-(2-methoxy ethoxy) ethanol (0.091 moles) are placed in a 500 mL round bottom flask. Next, under vigorous stirring, 14.09 grams of allyl alcohol is added to the above combination. The mixture is heated at 50° C. for 24 hours in an oil bath. Next, the excess NaOH is filtered off, and the toluene is removed by rotavap. The residual liquid is diluted with water and extracted with dichloromethane. The target compound is isolated by removing the dichloro-methane by rotavap, and further purified by distillation under reduced pressure. The boiling point of the resulting product is about 50° C. at 0.7 mm of Hg. The yield is about 98%; while the purity is about 99.9% (confirmed by GC). $^1$H NMR (CDCl$_3$, 300 MHz): δ 3.3 (s, 3H, CH$_3$—O—CH$_2$—CH$_2$—), 3.5 to 3.7 (8H, —O—CH$_2$—CH$_2$—O—), 4.0 (d, 2H, —O—CH$_2$—CH—), 5.3 (m, 2H, CH$_2$=CH—), 5.8 (m, 1H, CH$_2$=CH—CH$_2$—).

Synthesis of $D_5H$.DEG:

Again, a stoichiometric excess of $D_5H$ is used to maximize the formation of the mono-substituted $D_5H$. Thus, 20 grams of $D_5H$ ($66\times10^{-3}$ moles) is placed into a 100 mL round bottom flask and 5.3 grams of allyl 2-(2-methoxy ethoxy)ethyl ether ($33.3\times10^{-3}$ moles) is added via a syringe. Karstedt's catalyst (40 μL, $4.5\times10^{-6}$ moles as platinum) is added and the flask is closed with a rubber septum. The system is heated at 80° C. for 30 minutes in an oil bath. The resulting product is isolated by distillation under reduced pressure. The boiling point of the resulting product is about 150° C. at 0.6 mm of Hg. The yield is about 70%; while the purity is about 87% (confirmed by GC). $^1$H NMR (CDCl$_3$, 300 MHz): δ 0.1 (s, 15H, Si—CH$_3$), 0.5 (t, 2H, Si—CH$_2$—), 1.7 (m, 2H, Si—CH$_2$—CH$_2$—), 3.3 (s, 3H, CH$_3$—O—CH$_2$CH$_2$—), 3.5-3.7 (8H, —O—CH$_2$CH$_2$—O—), 4.7 (s, 4H, Si—H).

Synthesis of $D_5H$.TRIS:

Again, a stoichiometric excess of $D_5H$ is used to maximize the formation of the mono-substituted $D_5H$. Thus, 20 grams of $D_5H$ ($66\times10^{-3}$ moles) is placed into a 100 mL round bottom flask and 10.65 grams of vinyl tris(trimethylsiloxy) silane ($33.3\times10^{-3}$ moles) is added via a syringe. Karstedt's catalyst (40 μL, $4.5\times10^{-6}$ moles as platinum) is added and the flask is closed with a rubber septum. The system is heated at 80° C. for 30 minutes in an oil bath. The resulting product is isolated by distillation under reduced pressure. The boiling point of the resulting product is about 100° C. at 1 mm of Hg. The yield is about 70%; while the purity is about 90% (confirmed by GC). $^1$H NMR (CDCl$_3$, 300 MHz): δ 0.1 (m, 42H, Si—CH$_3$), 0.38 (m, 2H, Si—CH$_2$—), 0.1 (t, 2H, Si—CH$_2$CH$_2$—) and 4.7 (s, 4H, Si—H).

Synthesis of Amphiphilic Co-Networks:

Representative PEG/PD$_5$/PDMS membranes are synthesized as follows: 0.16 grams of A-PEG-A ($0.068\times10^{-3}$ moles), 2.2 mL of V-PDMS-V ($0.031\times10^{-3}$ moles) and 3 mL of toluene are placed in a 100 mL round bottom flask containing a magnetic stirring bar. $D_5H$ (0.21 mL, $0.07\times10^{-3}$ moles) is added to this mixture, and the charge is heated at 100° C. in an oil bath. Karstedt's catalyst solution (50 μL, equivalent to 200 ppm of platinum) is added, and the charge is stirred at 10° C. for 4 hours. Water (10 μL, $0.55\times10^{-3}$ moles) is introduced to the above mixture and stirring is continued for another 2 hours.

Membranes are prepared by pouring the various charges into rectangular (approximately 8×8 cm) cavities in a Teflon mold. Crosslinking is affected by placing the charges in these molds in an oven at 70° C. for 48 hours. The co-networks are mechanically peeled off the Teflon mold and their thicknesses are determined by a caliper.

Characterization:

Instrumentation: $^1$H and $^{13}$C NMR spectra are acquired on a Varian Unity plus 400 MHz spectrometer with the use of a CDCl$_3$ solvent.

Oxygen Permeability: The oxygen permeability of networks is determined as is detailed below.

Mechanical Properties: Tensile properties of water swollen membranes prepared in accordance with the above process are measured using an Instron 5567 (20 N load cell) equipped with a mechanical extensometer at a crosshead speed of 5 mm/min. Microdumbells are die-cut according to ASTM 638-V (i.e., gauge length 7.62 mm, width 3.18 mm). Sample thickness is measured in micrometer. Tensile properties of four specimens are determined and averaged.

Results and Discussion:

Turning again to FIG. 1, FIG. 1 details one possible process by which to produce amphiphilic networks in accordance with the present invention. Upon hydrosilation and oxidation (partial), the contents are poured into a mold where condensations between Si—OH groups occur. During the 48 hours employed for crosslinking, three kinds of processes occur: (1) condensation between Si—OH groups; (2) oxidation of remaining Si—H to Si—OH groups by atmospheric air followed by condensations; and (3) phase separation between PEG and PDMS as the solvent evaporates off. The phase separation between the hydrophilic and hydrophobic moieties is highly undesirable. In one embodiment, a method by which to prevent such phase separation from occurring is the use of hydrophilically-modified D$_5$H.

While not wishing to be bound to any one embodiment and/or theory, one possible method by which to prevent the above-mentioned phase separation is to use a D$_5$H compound that has been modified with one or more hydrophilic groups that have an affinity to/for, for example, polyethylene glycol. This achieves and/or yields a decrease/reduction in the interfacial tension between, for example, the PEG and PDMS components of an amphiphilic co-network, and thereby prevents undesirable phase separation.

Thus D$_5$H based crosslinkers having at least one octofluoropentyl group (D$_5$H.OFPE), as well as D$_5$H crosslinkers having at least one diethylene glycol group (D$_5$H.DEG), are disclosed herein and employed for network synthesis. Also disclosed herein are synthesis routes designed to produce suitably substituted D$_5$H crosslinkers.

In one instance, the use of D$_5$H.OFPE or D$_5$H.DEG in membranes formed in accordance with one embodiment of the present invention fulfills two functions: (1) the modified crosslinker compatibilizes PDMS and PEG and limits phase separation; and (2) the modified crosslinker provides crosslinking sites due to the four Si—H bonds in the molecule.

In one embodiment, the modified crosslinkers of the present invention can be synthesized by a hydrosilation reaction between D$_5$H and one or more allyl derivatives of a respective alcohol using Karstedt's catalyst (see the above Reaction Schemes). Due to the presence of 5 equally reactive Si—H bonds in D$_5$H, a molar excess of D$_5$H over the allyl derivative is used, in one embodiment, during synthesis to minimize the amounts of di- or tri-hydrosilation products. The targeted material can be isolated by distillation under reduced pressure.

Another crosslinker within the scope of the present invention is D$_5$H.TRIS as is discussed above Though the tris(trimethylsiloxy) silane moiety contained in D$_5$H.TRIS is not likely to influence phase separation, it can however have an effect on oxygen permeability due to the large free volume of the tris(trismethylsiloxy) silane moiety. This in turn enables one to produce highly oxygen permeable networks and/or co-networks when a D$_5$H.TRIS crosslinker is utilized.

Table 1 shown below summarizes the compositions of representative membranes prepared, together with water swelling and optical clarity data. As can be noticed from the table individual crosslinkers alone (D$_5$H, D$_5$H.OFPE, D$_5$H.DEG, D$_5$H.TRIS) or a combination of them under various ratios are employed for network synthesis to obtain optimum network properties. In addition, networks with varying molecular weight of PDMS are synthesized. The solubles in the network are extracted with isopropanol followed by water. The total amounts of extractables are generally in the range of about 8 to about 12 weight percent.

Oxygen Permeability: The oxygen permeability of the membranes formed in accordance with the present invention is measured using the process and apparatus disclosed in PCT Patent Application No. PCT/US06/006499, filed with the United States Receiving Office on Feb. 24, 2006, the disclosure of which is incorporated by reference in its entirety. The experimental oxygen permeability values of the various networks are given in Table 1. The Dk of a sample with 24.7% PEG and 40% water swelling is 268 barrers. This value is about three times higher than that of Pure Vision (Balfilcon A, Bausch and Lomb).

The bi-continuous/bipercolating nature of the networks can be confirmed by the percolation of both water and hexanes through the membranes.

TABLE 1

| | Charge (weight %)[a] | | | | | | | Optical | Oxygen Permeability (Barrers)[d] | Mechanical Properties[e] | | |
|---|---|---|---|---|---|---|---|---|---|---|---|---|
| Sample | PEG | D$_5$H | D$_5$H•OFPE | D$_5$H•DEG | D$_5$H•TRIS | PDMS | EWC[b] % | Clarity[c] | | Tensile MPa | Modulus g/mm$^2$ | Elongation % |
| 1 | 25 | 6 | 0 | 0 | 0 | 69 | 29 | clear | 268 | — | — | — |
| 2 | 25 | 3 | 3 | 0 | 0 | 69 | 30 | clear | 212 | 1.28 | 2.7 | 280 |
| 3 | 25 | 0 | 6 | 0 | 0 | 69 | — | clear | 200 | — | — | — |
| 4 | 25 | 6 | 6 | 0 | 0 | 63 | 40 | clear | 223 | — | — | — |
| 5 | 25 | 0 | 3 | 3 | 0 | 69 | 38 | clear | 174 | 0.55 | 1.9 | 200 |
| 6 | 25 | 0 | 0 | 6 | 0 | 69 | 44 | clear | 200 | 0.74 | 2.1 | 210 |
| 7 | 25 | 3 | 0 | 3 | 0 | 69 | 36 | clear | 205 | 0.5 | 2.6 | 180 |
| 8 | 25 | 3 | 0 | 0 | 3 | 69 | 35 | opaque | — | — | — | — |
| 9 | 25 | 0 | 6 | 0 | 6 | 63 | 34 | opaque | — | — | — | — |

TABLE 1-continued

| | Charge (weight %)[a] | | | | | | | Oxygen Permeability (Barrers)[d] | Mechanical Properties[e] | | |
|---|---|---|---|---|---|---|---|---|---|---|---|
| Sample | PEG | D5H | D5H•OFPE | D5H•DEG | D5H•TRIS | PDMS | EWC[b] % | Optical Clarity[c] | | Tensile MPa | Modulus g/mm$^2$ | Elongation % |
| 10 | 26 | 16 | 0 | 0 | 0 | 58[f] | 29 | clear | — | — | — | — |
| 11 | 26 | 28 | 0 | 0 | 0 | 49[f] | 29 | clear | 116 | — | — | — |
| 12 | 25 | 8 | 8 | 0 | 0 | 58[f] | 23 | clear | 154 | — | — | — |
| 13 | 25 | 0 | 16 | 0 | 0 | 58[f] | 30 | clear | 190 | — | — | — |
| 14 | 25 | 8 | 0 | 8 | 0 | 58[f] | — | — | — | — | — | — |
| 15 | 25 | 0 | 0 | 16 | 0 | 58[f] | 29 | — | 206 | — | — | — |
| 16 | 25 | 0 | 8 | 8 | 0 | 58[f] | 28 | — | 154 | — | — | — |

[a]PEG$_{4000}$, PDMS$_{28,500}$
[b]Equilibrium water swelling (EWC) = [(W$_s$ − W$_d$)/W$_s$] × 100, where W$_s$ and W$_d$ are the weights of the swollen and dry membranes, respectively.
[c]Visual optical clarity of water swollen membranes.
[d]Barrers [10 − 10 × (cm$^3$ of O$_2$) × cm]/[cm$^2$ × s × cm Hg], of water swollen membranes.
[e]Averages of four determinations of water swollen membranes.
[f]PDMS$_{9,400}$ Although the invention has been described in detail with particular reference to certain embodiments detailed herein, other embodiments can achieve the same results. Variations and modifications of the present invention will be obvious to those skilled in the art and the present invention is intended to cover in the appended claims all such modifications and equivalents.

What is claimed is:

1. A multicomponent network comprising the reaction product of at least one hydrophilic polymer, at least one hydrophobic polymer and at least one mono-modified alkyl-substituted cyclopentasiloxane crosslinking composition according to the following formula:

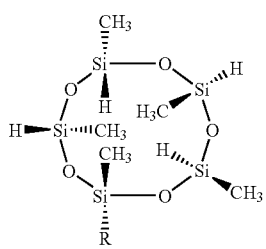

(V)

where R is a moiety having one or more ethylene oxide units and 2 to 20 carbon atoms, a di-glycol moiety that contains from 4 to about 20 carbon atoms, an ether moiety that contains from about 4 to about 20 carbon atoms, a partially or fully halogenated ether moiety that contains from about 4 to about 20 carbon atoms, or a siloxy silane moiety according to the formula shown below:

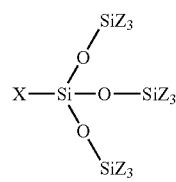

where X is a linear or branched $C_1$ to $C_{10}$ alkyl group, a linear or branched $C_2$ to $C_{10}$ alkenyl group, a linear or branched $C_2$ to $C_{10}$ alkynyl group, and where each Z is independently selected from a linear or branched $C_1$ to $C_{20}$ alkyl group, a linear or branched $C_2$ to $C_{20}$ alkenyl group, a linear or branched $C_2$ to $C_{10}$ alkynyl group.

2. The multicomponent network of claim 1, wherein the at least one hydrophilic polymer is selected from one or more polyalkyl glycol polymers, one or more di-alkenyl or di-alkynyl terminated poly N-vinyl pyrrolidinone polymers, one or more di-alkenyl or di-alkynyl terminated poly-dimethylacrylamide polymers, one or more di-alkenyl or di-alkynyl terminated poly-oxazoline polymers, or combinations of two or more different hydrophilic polymers thereof.

3. The multicomponent network of claim 2, wherein the number of repeating units in the one or more hydrophilic polymers is in the range of about 5 to about 5,000.

4. The multicomponent network of claim 2, wherein the number of repeating units in the one or more hydrophilic polymers is in the range of about 40 to about 500.

5. The multicomponent network of claim 1, wherein the at least one hydrophobic polymer is selected from at least one di-alkenyl or di-alkynyl terminated siloxane polymer.

6. The multicomponent network of claim 5, wherein the number of repeating siloxane repeating units in the at least one di-alkenyl or di-alkynyl terminated siloxane polymer is in the range of about 5 to about 5,000.

7. The multicomponent network of claim 5, wherein the number of repeating siloxane repeating units in the at least one di-alkenyl or di-alkynyl terminated siloxane polymer is in the range of about 40 to about 500.

8. The multicomponent network of claim 1, wherein the at least one mono-modified alkyl-substituted cyclopentasiloxane crosslinking composition is selected from one or more of D$_5$H.TRIS, D$_5$H.OFPE, and/or D$_5$H.DEG.

9. The multicomponent network of claim 1, wherein the at least one mono-modified alkyl-substituted cyclopentasiloxane crosslinking composition is D$_5$H.TRIS having a chemical formula as shown below:

(VII)

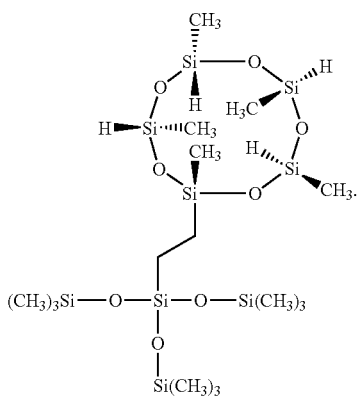

10. The multicomponent network of claim 1, wherein the at least one mono-modified alkyl-substituted cyclopentasiloxane crosslinking composition is $D_5H.OFPE$ having a chemical formula as shown below:

(VIII)

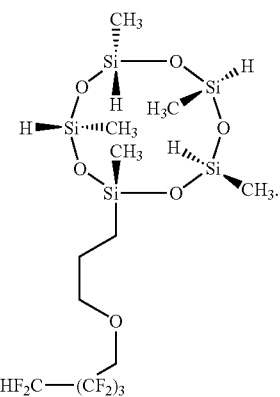

11. The multicomponent network of claim 1, wherein the at least one mono-modified alkyl-substituted cyclopentasiloxane crosslinking composition is $D_5H.DEG$ having a chemical formula as shown below:

(IX)

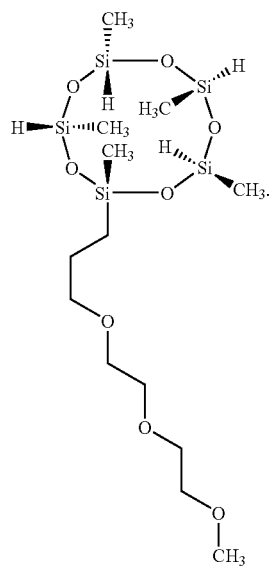

12. The multicomponent network of claim 1, wherein the multicomponent network is used to produce a film.

13. The multicomponent network of claim 1, wherein the multicomponent network is used to produce a contact lens.

14. A multicomponent network comprising the reaction product of at least one hydrophilic polymer, at least one polydimethylsiloxane polymer and at least one mono-modified alkyl-substituted cyclopentasiloxane crosslinking composition according to the following formula:

(V)

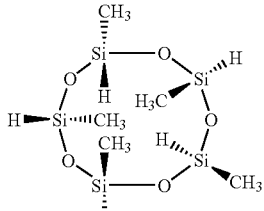

where R is a moiety having one or more ethylene oxide units and 2 to 20 carbon atoms, a di-glycol moiety that contains from 4 to about 20 carbon atoms, an ether moiety that contains from about 4 to about 20 carbon atoms, a partially or fully halogenated ether moiety that contains from about 4 to about 20 carbon atoms, or a siloxy silane moiety according to the formula shown below:

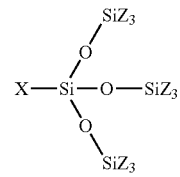

where X is a linear or branched $C_1$ to $C_{10}$ alkyl group, a linear or branched $C_2$ to $C_{10}$ alkenyl group, a linear or branched $C_2$ to $C_{10}$ alkynyl group, and where each Z is independently selected from a linear or branched $C_1$ to $C_{20}$ alkyl group, a linear or branched $C_2$ to $C_{20}$ alkenyl group, a linear or branched $C_2$ to $C_{10}$ alkynyl group.

15. The multicomponent network of claim 14, wherein the at least one hydrophilic polymer is selected from one or more polyalkyl glycol polymer, one or more di-alkenyl or di-alkynyl terminated poly N-vinyl pyrrolidinone polymers, one or more di-alkenyl or di-alkynyl terminated poly-dimethylacrylamide polymers, one or more di-alkenyl or di-alkynyl terminated poly-oxazoline polymers, or combinations of two or more different hydrophilic polymers thereof.

16. The multicomponent network of claim 15, wherein the number of repeating units in the one or more hydrophilic polymers is in the range of about 40 to about 500.

17. The multicomponent network of claim 14, wherein the at least one hydrophilic polymer is selected from one or more polyalkyl glycol polymers.

18. The multicomponent network of claim 14, wherein the number of repeating siloxane repeating units in the at least one polydimethylsiloxane polymer is in the range of about 40 to about 500.

19. The multicomponent network of claim 14, wherein the at least one mono-modified alkyl-substituted cyclopentasiloxane crosslinking composition is selected from one or more of $D_5H.TRIS$, $D_5H.OFPE$, and/or $D_5H.DEG$.

20. The multicomponent network of claim 14, wherein the at least one mono-modified alkyl-substituted cyclopentasiloxane crosslinking composition is D₅H.TRIS having a chemical formula as shown below:

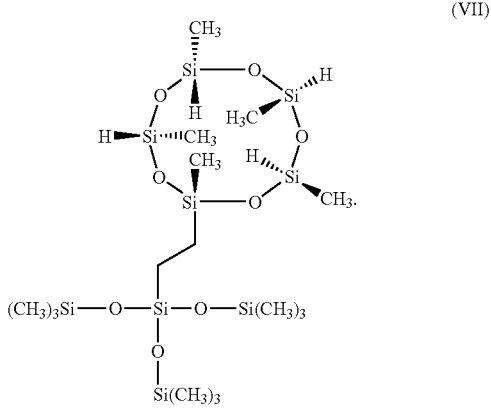

(VII)

21. The multicomponent network of claim 14, wherein the at least one mono-modified alkyl-substituted cyclopentasiloxane crosslinking composition is D₅H.OFPE having a chemical formula as shown below:

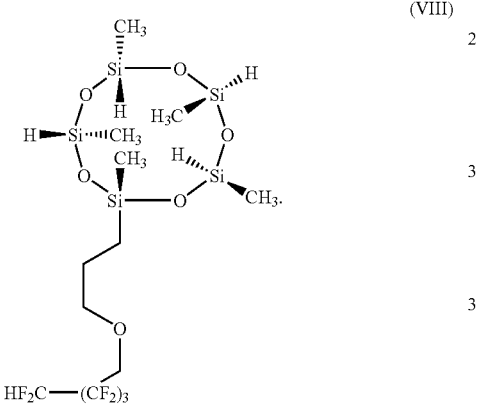

(VIII)

22. The multicomponent network of claim 14, wherein the at least one mono-modified alkyl-substituted cyclopentasiloxane crosslinking composition is D₅H.DEG having a chemical formula as shown below:

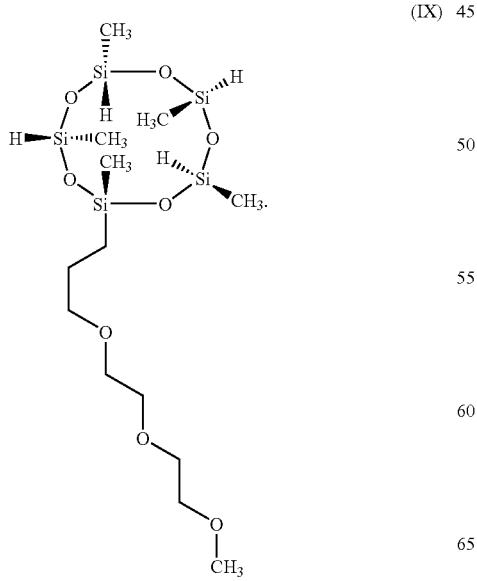

(IX)

23. The multicomponent network of claim 14, wherein the multicomponent network is an amphiphilic co-network.

24. The multicomponent network of claim 14, wherein the multicomponent network is used to produce a film.

25. The multicomponent network of claim 14, wherein the multicomponent network is used to produce a contact lens.

26. A multicomponent network comprising the reaction product of at least one hydrophilic polymer, at least one di-alkenyl or di-alkynyl terminated polysiloxane polymer and at least one mono-, di-, tri- or tetra-modified cyclopentasiloxane crosslinking composition as shown in the formula below:

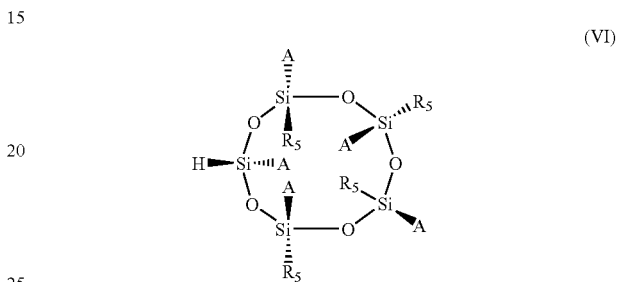

(VI)

where the As are either all methyl groups, all ethyl groups, or all propyl groups, where each $R_5$ is independently selected from hydrogen, a moiety having one or more ethylene oxide units and 2 to 20 carbon atoms, a di-glycol moiety that contains from 4 to about 20 carbon atoms, an ether moiety that contains from about 4 to about 20 carbon atoms, a partially or fully halogenated ether moiety that contains from about 4 to about 20 carbon atoms, or a siloxy silane moiety according to the formula shown below:

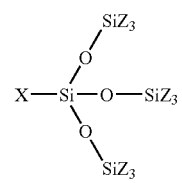

where X is a linear or branched $C_1$ to $C_{10}$ alkyl group, a linear or branched $C_2$ to $C_{10}$ alkenyl group, a linear or branched $C_2$ to $C_{10}$ alkynyl group, and where each Z is independently selected from a linear or branched $C_1$ to $C_{20}$ alkyl group, a linear or branched $C_2$ to $C_{20}$ alkenyl group, a linear or branched $C_2$ to $C_{10}$ alkynyl group.

27. The multicomponent network of claim 26, wherein the at least one hydrophilic polymer is selected from one or more polyalkyl glycol polymer, one or more di-alkenyl or di-alkynyl terminated poly N-vinyl pyrrolidinone polymers, one or more di-alkenyl or di-alkynyl terminated poly-dimethylacrylamide polymers, one or more di-alkenyl or di-alkynyl terminated poly-oxazoline polymers, or combinations of two or more different hydrophilic polymers thereof.

28. The multicomponent network of claim 27, wherein the at least one hydrophilic polymer is selected from one or more polyalkyl glycol polymers.

29. The multicomponent network of claim 26, wherein the at least one di-alkenyl or di-alkynyl terminated polydimethylsiloxane polymer is selected from any polymer according to the general formula shown below:

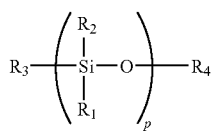

(III)

where p is equal to an integer in the range of about 5 to about 5,000, where $R_1$ and $R_2$ are independently $C_1$ to $C_6$ alkyl groups, and where $R_3$ and $R_4$ are independently $C_2$ to $C_{10}$ alkenyl groups or $C_2$ to $C_{10}$ alkynyl groups.

30. The multicomponent network of claim 29, wherein $R_1$ and $R_2$ are identical substituent groups.

31. The multicomponent network of claim 29, wherein $R_3$ and $R_4$ are identical substituent groups.

32. The multicomponent network of claim 26, wherein the crosslinking composition is a di-modified cyclopentasiloxane crosslinking composition.

33. The multicomponent network of claim 26, wherein the crosslinking composition is a tri-modified cyclopentasiloxane crosslinking composition.

34. A crosslinking composition comprising at least one mono-modified alkyl-substituted cyclopentasiloxane according to the following formula:

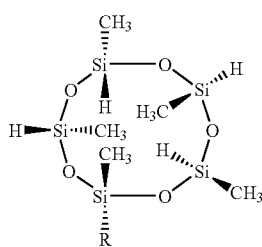

(V)

where R is a moiety having one or more ethylene oxide units and 2 to 20 carbon atoms, a di-glycol moiety that contains from 4 to about 20 carbon atoms, an ether moiety that contains from about 4 to about 20 carbon atoms, a partially or fully halogenated ether moiety that contains from about 4 to about 20 carbon atoms, or a siloxy silane moiety according to the formula shown below:

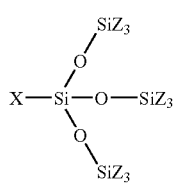

where X is a linear or branched $C_1$ to $C_{10}$ alkyl group, a linear or branched $C_2$ to $C_{10}$ alkenyl group, a linear or branched $C_2$ to $C_{10}$ alkynyl group, and where each Z is independently selected from a linear or branched $C_1$ to $C_{20}$ alkyl group, a linear or branched $C_2$ to $C_{20}$ alkenyl group, a linear or branched $C_2$ to $C_{10}$ alkynyl group, wherein the at least one mono-modified alkyl-substituted cyclopentasiloxane crosslinking composition is selected from one or more of $D_5H.TRIS$, $D_5H.OFPE$, and/or $D_5H.DEG$.

35. A crosslinking composition comprising at least one mono-modified alkyl-substituted cyclopentasiloxane according to the following formula:

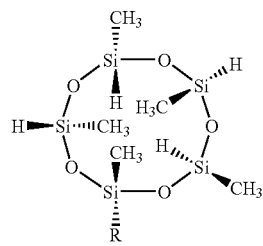

(V)

where R is a moiety having one or more ethylene oxide units and 2 to 20 carbon atoms, a di-glycol moiety that contains from 4 to about 20 carbon atoms, an ether moiety that contains from about 4 to about 20 carbon atoms, a partially or fully halogenated ether moiety that contains from about 4 to about 20 carbon atoms, or a siloxy silane moiety according to the formula shown below:

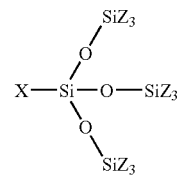

where X is a linear or branched $C_1$ to $C_{10}$ alkyl group, a linear or branched $C_2$ to $C_{10}$ alkenyl group, a linear or branched $C_2$ to $C_{10}$ alkynyl group, and where each Z is independently selected from a linear or branched $C_1$ to $C_{20}$ alkyl group, a linear or branched $C_2$ to $C_{20}$ alkenyl group, a linear or branched $C_2$ to $C_{10}$ alkynyl group, wherein the at least one mono-modified alkyl-substituted cyclopentasiloxane crosslinking composition is $D_5H.TRIS$ having a chemical formula as shown below:

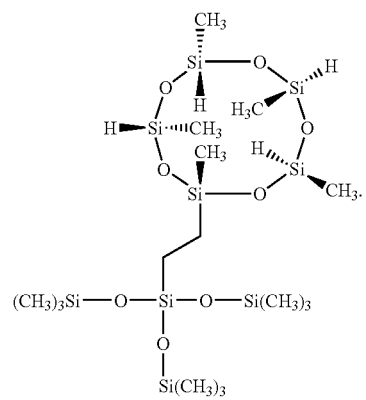

(VII)

36. A crosslinking composition comprising at least one mono-modified alkyl-substituted cyclopentasiloxane according to the following formula:

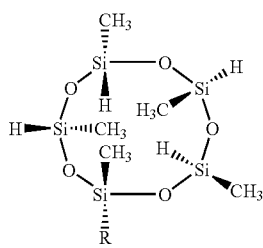

(V)

where R is a moiety having one or more ethylene oxide units and 2 to 20 carbon atoms, a di-glycol moiety that contains from 4 to about 20 carbon atoms, an ether moiety that contains from about 4 to about 20 carbon atoms, a partially or fully halogenated ether moiety that contains from about 4 to about 20 carbon atoms, or a siloxy silane moiety according to the formula shown below:

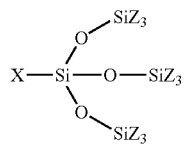

where X is a linear or branched $C_1$ to $C_{10}$ alkyl group, a linear or branched $C_2$ to $C_{10}$ alkenyl group, a linear or branched $C_2$ to $C_{10}$ alkynyl group, and where each Z is independently selected from a linear or branched $C_1$ to $C_{20}$ alkyl group, a linear or branched $C_2$ to $C_{20}$ alkenyl group, a linear or branched $C_2$ to $C_{10}$ alkynyl group, wherein the at least one mono-modified alkyl-substituted cyclopentasiloxane crosslinking composition is $D_5H.OFPE$ having a chemical formula as shown below:

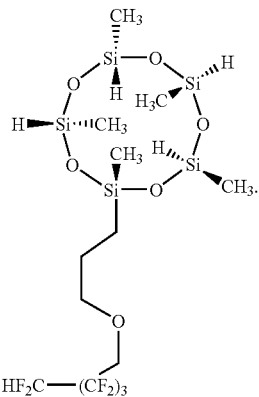

(VIII)

37. A crosslinking composition comprising at least one mono-modified alkyl-substituted cyclopentasiloxane according to the following formula:

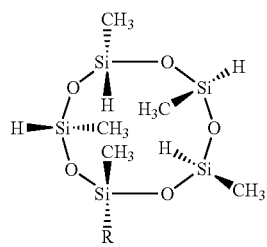

(V)

where R is a moiety having one or more ethylene oxide units and 2 to 20 carbon atoms, a di-glycol moiety that contains from 4 to about 20 carbon atoms, an ether moiety that contains from about 4 to about 20 carbon atoms, a partially or fully halogenated ether moiety that contains from about 4 to about 20 carbon atoms, or a siloxy silane moiety according to the formula shown below:

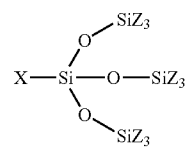

where X is a linear or branched $C_1$ to $C_{10}$ alkyl group, a linear or branched $C_2$ to $C_{10}$ alkenyl group, a linear or branched $C_2$ to $C_{10}$ alkynyl group, and where each Z is independently selected from a linear or branched $C_1$ to $C_{20}$ alkyl group, a linear or branched $C_2$ to $C_{20}$ alkenyl group, a linear or branched $C_2$ to $C_{10}$ alkynyl group, wherein the at least one mono-modified alkyl-substituted cyclopentasiloxane crosslinking composition is $D_5H.DEG$ having a chemical formula as shown below:

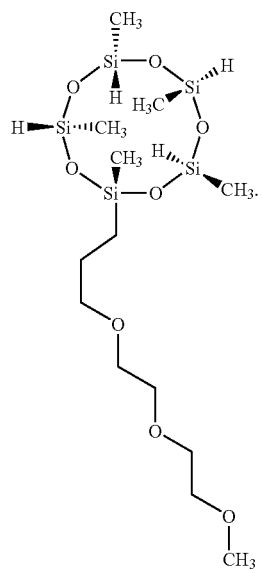

(IX)

38. A method for forming an amphiphilic network or co-network comprising the steps of:

(A) combining at least one hydrophilic polymer and at least one hydrophobic polymer to form a polymer mixture;

(B) adding at least one mono-, di-, tri- or tetra-modified cyclopentasiloxane composition to the polymer mixture of Step (A) to form a polymer-crosslinker mixture, the at least one mono-, di-, tri- or tetra-modified cyclopentasiloxane composition having a chemical formula as shown below:

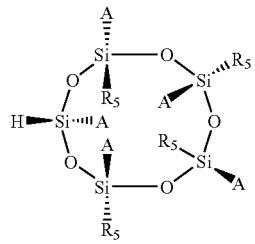
(VI)

where the As are either all methyl groups, all ethyl groups, or all propyl groups, where each $R_5$ is independently selected from hydrogen, a moiety having one or more ethylene oxide units and 2 to 20 carbon atoms, a di-glycol moiety that contains from 4 to about 20 carbon atoms, an ether moiety that contains from about 4 to about 20 carbon atoms, a partially or fully halogenated ether moiety that contains from about 4 to about 20 carbon atoms, or a siloxy silane moiety having a chemical formula as shown below:

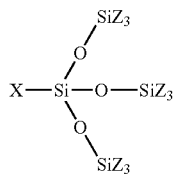

where X is a linear or branched $C_1$ to $C_{10}$ alkyl group, a linear or branched $C_2$ to $C_{10}$ alkenyl group, a linear or branched $C_2$ to $C_{10}$ alkynyl group, and where each Z is independently selected from a linear or branched $C_1$ to $C_{20}$ alkyl group, a linear or branched $C_2$ to $C_{20}$ alkenyl group, a linear or branched $C_2$ to $C_{10}$ alkynyl group;

(C) heating the polymer-crosslinker mixture of Step (B) to yield a pourable polymer-crosslinker mixture; and (D) crosslinking the pourable polymer-crosslinker mixture of Step (C) to yield a crosslinked amphiphilic network or co-network.

39. The method of claim 38, wherein the at least one hydrophilic polymer is selected from one or more polyalkyl glycol polymer, one or more di-alkenyl or di-alkynyl terminated poly N-vinyl pyrrolidinone polymers, one or more di-alkenyl or di-alkynyl terminated poly-dimethylacrylamide polymers, one or more di-alkenyl or di-alkynyl terminated poly-oxazoline polymers, or combinations of two or more different hydrophilic polymers thereof.

40. The method of claim 38, wherein the at least one hydrophobic polymer is selected from at least one di-alkenyl or di-alkynyl terminated siloxane polymer.

41. A polymer film produced by the method of claim 38.

42. A contact lens produced by the method of claim 38.

43. An amphiphilic co-network produced by the method of claim 38.

44. A method for forming an amphiphilic network or co-network comprising the steps of:
(i) combining at least one hydrophilic polymer and at least one hydrophobic polymer to form a polymer mixture;

(ii) adding at least one mono-modified alkyl-substituted cyclopentasiloxane crosslinking composition to the polymer mixture of Step (i) to form a polymer-crosslinker mixture, the at least one mono-modified alkyl-substituted cyclopentasiloxane crosslinking composition having a chemical formula as shown below:

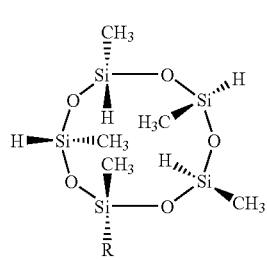
(V)

where R is a moiety having one or more ethylene oxide units and 2 to 20 carbon atoms, a di-glycol moiety that contains from 4 to about 20 carbon atoms, an ether moiety that contains from about 4 to about 20 carbon atoms, a partially or fully halogenated ether moiety that contains from about 4 to about 20 carbon atoms, or a siloxy silane moiety having a chemical formula as shown below:

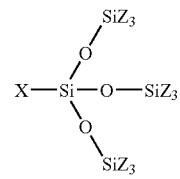

where X is a linear or branched $C_1$ to $C_{10}$ alkyl group, a linear or branched $C_2$ to $C_{10}$ alkenyl group, a linear or branched $C_2$ to $C_{10}$ alkynyl group, and where each Z is independently selected from a linear or branched $C_1$ to $C_{20}$ alkyl group, a linear or branched $C_2$ to $C_{20}$ alkenyl group, a linear or branched $C_2$ to $C_{10}$ alkynyl group;

(iii) heating the polymer-crosslinker mixture of Step (ii) to yield a pourable polymer-crosslinker mixture; and (iv) crosslinking the pourable polymer-crosslinker mixture of Step (iii) to yield a crosslinked amphiphilic network or co-network.

45. The method of claim 44, wherein the at least one hydrophilic polymer is selected from one or more polyalkyl glycol polymer, one or more di-alkenyl or di-alkynyl terminated poly N-vinyl pyrrolidinone polymers, one or more di-alkenyl or di-alkynyl terminated poly-dimethylacrylamide polymers, one or more di-alkenyl or di-alkynyl terminated poly-oxazoline polymers, or combinations of two or more different hydrophilic polymers thereof.

46. The method of claim 44, wherein the at least one hydrophobic polymer is selected from at least one di-alkenyl or di-alkynyl terminated siloxane polymer.

47. The method of claim 44, wherein the at least one mono-modified alkyl-substituted cyclopentasiloxane crosslinking composition is selected from one or more of $D_5H.TRIS$, $D_5H.OFPE$, and/or $D_5H.DEG$.

48. The method of claim 44, wherein the at least one mono-modified alkyl-substituted cyclopentasiloxane crosslinking composition is $D_5H.TRIS$ having a chemical formula as shown below:

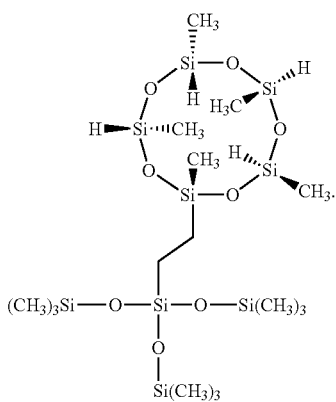

(VII)

49. The method of claim 44, wherein the at least one mono-modified alkyl-substituted cyclopentasiloxane crosslinking composition is D₅H.OFPE having a chemical formula as shown below:

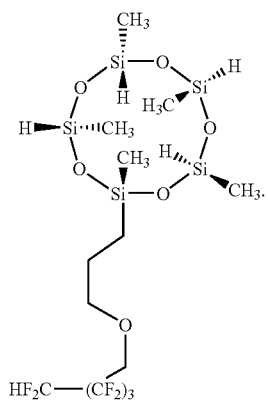

(VIII)

50. The method of claim 44, wherein the at least one mono-modified alkyl-substituted cyclopentasiloxane crosslinking composition is D₅H.DEG having a chemical formula as shown below:

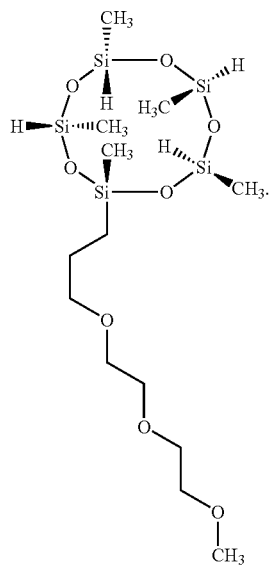

(IX)

51. An amphiphilic co-network produced by the method of claim 44.

52. A polymer film produced by the method of claim 44.

53. A contact lens produced by the method of claim 44.

\* \* \* \* \*